United States Patent [19]

Crystal et al.

[11] Patent Number: 5,045,865

[45] Date of Patent: Sep. 3, 1991

[54] MAGNETICALLY AND ELECTROSTATICALLY ASSISTED THERMAL TRANSFER PRINTING PROCESSES

[75] Inventors: Richard G. Crystal, Los Altos, Calif.; Hardy Sonnenberg, Puslinch, Canada

[73] Assignee: Xerox Corporation, Stamford, Conn.

[21] Appl. No.: 454,810

[22] Filed: Dec. 21, 1989

[51] Int. Cl.[5] .......................... G01D 9/00; B41J 2/315

[52] U.S. Cl. ................................ 346/1.1; 346/76 PH; 358/298; 400/120

[58] Field of Search ........................... 346/76 PH, 1.1; 400/120

[56] References Cited

U.S. PATENT DOCUMENTS

| | | | |
|---|---|---|---|
| 2,940,847 | 6/1960 | Kaprelian | 96/1 |
| 3,287,153 | 11/1966 | Schwarz et al. | 117/36.1 |
| 3,348,651 | 10/1967 | Mater et al. | 197/172 |
| 3,392,042 | 7/1968 | Findlay et al. | 117/36.1 |
| 3,441,940 | 4/1969 | Salaman et al. | 346/1 |
| 3,480,962 | 11/1969 | Weigl et al. | 346/1 |
| 3,484,508 | 12/1969 | Findlay | 264/45 |
| 3,745,586 | 7/1973 | Braudy | 346/76 |
| 3,930,099 | 12/1975 | Gregson | 428/315 |
| 3,989,131 | 11/1976 | Knirsch et al. | 197/1 R |
| 4,128,345 | 12/1978 | Brady | 400/120 |
| 4,205,320 | 5/1980 | Fujii | 346/1.1 |
| 4,315,267 | 2/1982 | Sonoda et al. | 346/1.1 |
| 4,321,286 | 3/1982 | Scott et al. | 427/152 |
| 4,510,511 | 4/1985 | Akutsu | 346/140 R |
| 4,525,722 | 6/1985 | Sachdev et al. | 346/1.1 |
| 4,541,042 | 9/1985 | Kohashi | 346/76 PH |
| 4,544,292 | 10/1985 | Kohle et al. | 400/241.2 |
| 4,549,824 | 10/1985 | Sachdev et al. | 400/241.1 |
| 4,550,324 | 10/1985 | Tamaru et al. | 346/76 PH |
| 4,567,489 | 1/1986 | Obstfelder et al. | 346/76 PH |
| 4,624,881 | 11/1986 | Shini | 428/207 |
| 4,803,119 | 2/1989 | Duff et al. | 428/321.3 |

FOREIGN PATENT DOCUMENTS

| | | | |
|---|---|---|---|
| 0254420 | 1/1988 | European Pat. Off. . | |
| 0076294 | 5/1984 | Japan | 346/76 PH |
| 0210474 | 10/1985 | Japan | 346/76 PH |
| 0160259 | 7/1986 | Japan | 346/76 PH |

*Primary Examiner*—Benjamin R. Fuller
*Assistant Examiner*—Huan Tran
*Attorney, Agent, or Firm*—Judith L. Byorick

[57] ABSTRACT

Disclosed is a thermal transfer printing process which comprises incorporating into a thermal transfer printing apparatus with a thermal printhead a transfer element comprising a substrate upon which is contained an ink, contacting the transfer element with a receiver sheet, applying heat imagewise from the printhead to the transfer element, and applying a field between the transfer element and the receiver sheet to enhance imagewise transfer of the ink from the transfer element to the receiver sheet. The applied field may be either electric or magnetic in nature.

37 Claims, 4 Drawing Sheets

MAGNETICALLY AND ELECTROSTATICALLY ASSISTED THERMAL TRANSFER PRINTING PROCESSES

BACKGROUND OF THE INVENTION

The present invention relates to thermal transfer printing, and, more specifically, to improved thermal transfer printing processes wherein transfer of the ink to the receiver sheet is enhanced by an electric or magnetic field.

Thermal printing is a no nonipact printing process that enables formation of high resolution images. These printing processes are simple, offer low noise levels, and are very reliable over extended usages. Thermal printing processes may be classified into three categories. Direct thermal printing entails the imagewise heating of special papers coated with heat sensitive dyes, such that an image forms in the heated areas. Another method of thermal printing is known as the dye transfer or dye sublimation technique, and operates by heating a transfer element coated with a sublimable dye, which transfer element is not in contact with the receiving sheet. When the transfer element is imagewise heated, the dye sublimates and migrates to the receiver sheet, which possesses a polymeric coating into which the dye diffuses, forming an image. A third method of thermal printing is known as thermal transfer printing. The thermal transfer printing process entails imagewise heating of a transfer element containing ink, which transfer element is in intimate contact with the heater on one surface and the receiving sheet on the other surface. Imagewise heating of the transfer element affects the ink in such a way as to cause it to transfer from the transfer element to the receiving sheet, thereby resulting in image formation. Thermal transfer printing methods generally employ uncoated plain papers, which enables prints with acceptable appearance and excellent archival properties. In addition, the thermal transfer printing method can be employed for color printing applications by using transfer elements of the desired color or colors.

Thermal transfer printing processes generally employ a thermal printhead, a transfer element, and a receiver sheet. The side of the transfer element containing the ink is placed in contact with the receiver sheet, and heat originating from the printhead is then applied to the transfer element. Heat conducted through the element increases the temperature of the ink, which can cause it to melt, soften, decrease in viscosity, or otherwise undergo a transition that enables the ink to transfer to the receiver sheet. After the receiver sheet and transfer element are separated, an image remains on the receiver sheet. An alternative method of heating the transfer element, known as resistive heating, employs an array of electrodes instead of thermal printhead to generate a current between the electrodes and a grounded conductive layer in the transfer element. This method is described in the IBM Journal of Research & Development, Vol. 29, No. 5, 1985, the disclosure of which is totally incorporated herein by reference. Additional information concerning thermal transfer printing processes is disclosed in Thermal Transfer Printing: Technology, Products, Prospects, published by Datek Information Services, P.O. Box 68, Newtonville, Mass., the disclosure of which is totally incorporated herein by reference.

The processes of the present invention enhance the thermal transfer printing process by assisting the transfer of the ink to the receiver sheet by means of an electric or magnetic field. Assisting the transfer processes enables more rapid printing processes, since the ink is drawn toward the receiver sheet. Assisting transfer also enhances the formation of images on rough paper, since the field attracts or pushes the ink into the depressions on the surface of a rough receiver sheet. In addition, field assisted thermal transfer printing processes enhance printing with multiuse transfer elements, especially those as described in copending application U.S. Ser. No. 454,800, the disclosure of which is totally incorporated herein by reference. The lifetime of a multiuse thermal transfer element is improved by carefully metering the amount of ink released during each use, so that only the required amount of ink is released from the transfer element and the remaining ink is available for subsequent imaging processes using the transfer element. Selective application of a magnetic or electric field to a multi-use transfer element can meter the amount of ink released for each image formed by either enhancing or restricting ink release. Further, field assisted thermal transfer printing processes in which multi-use transfer elements are employed enables the formation of images having a "gray scale" of image density. By gray scale, it is meant that the image density can be varied along a continuum from no image at all to maximum image density.

The thermal transfer printing process has been disclosed in, for example, U.S. Pat. No. 3,441,940 and U.S. Pat. No. 3,745,586, the disclosures of each of which are totally incorporated herein by reference. In addition, augmented thermal transfer printing processes are known. For example, U.S. Pat. No. 3,989,131 discloses a pressure assisted thermal transfer printing process employing an electrothermic printing unit for writing dot matrix characters on a printing line of recording medium by means of an electrothermal printing head which is continually movable along the printing line. Pressure is interposed between the head and the recording medium, pressure means being provided for pressing the printing elements against the transfer element and the receiver sheet. In addition, U.S. Pat. No. 4,541,042 discloses a transfer recording process assisted by a solvent, wherein a receiving medium such as paper and an ink transfer sheet are placed in contact between a platen and a thermal head, and a liquid, volatile solvent is applied to the paper. The solvent enables high speed thermodissolving transfer of the ink to the paper by heating selected areas to form an image.

Further, U.S. Pat. No. 4,525,722 discloses a thermal transfer printing process assisted by chemical heat amplification, wherein some of the heat necessary for melting and transferring the ink from a solid fusible layer in a ribbon to a receiving medium is provided by an exothermic reaction involving an exothermic material contained in a layer in the ink ribbon. Also, U.S. Pat. No. 4,549,824 discloses a thermal transfer printing process aided by an exothermic reaction, wherein an aromatic azido compound is added to the ink, said azido compound being one that exotherms at the conditions of thermal ink transfer. In addition, U.S. Pat. No. 4,550,324 discloses an ink transfer thermal printer utilizing a thermosensitive ink that is solid at normal temperatures, with selected portions of the ink being liquefied by heating and transferred onto recording paper. The printer can be of either contact or non-contact (ink jet)

configuration, and eliminates the need to utilize disposable materials such as ink ribbons.

U.S. Pat. No. 4,567,489, discloses a thermal printhead for a thermographic printer having an electrically insulating substrate on which resistors are placed that form impression points and current supply and current discharge leads bonded to the resistors. The printhead includes a structure for forming a magnetic field that acts on the resistors in the immediate proximity of the resistors and along the resistor print line. The magnetic field is directed such that when the current flows through the resistors, the current paths are deflected upward into the upper part of the resistor on its outer surface. The single resistor impression points thus reach their highest temperature at the printing surface where they must deliver heat to the recording medium, which results in the heat needed for heating the resistor being supplied more quickly to the recording medium, thereby reducing the cooling time of the single resistor impression point so that a higher printing velocity can be attained with the thermal printhead.

Additionally, U.S. Pat. No. 4,510,511 discloses a picture recording method and apparatus using an ink containing an evaporable coloring matter, which enables printing on a medium without an ink ribbon. The special ink is supplied to an ink transporting means and then cooled below the melting point of the ink bonding agent. A discharge energy is applied, controlled according to the picture to be formed, which causes the coloring matter to fly to the recording medium opposite the transporting means. Essentially, the process entails fluidizing a marking material by heat, picking up the liquid marking material on a gravure type roll, and selectively transferring it to the receiving sheet by means of a high voltage field.

In addition, U.S. Pat. No. 4,803,119, the disclosure of which is totally incorporated herein by reference, discloses ink coating compositions for impact typewriter ribbons, which ink coatings comprise a sponge material having dispersed therein an ink comprising pigment particles and a dimer acid. Further, U.S. Pat. No. 3,348,651, the disclosure of which is totally incorporated herein by reference, discloses pressure sensitive ink transfer ribbons, tapes, and sheets having a microporous inking composition for use in typewriters, high speed printers, and optical scanning devices. The pressure sensitive ink transfer medium comprises a shock-absorbent base layer of an elastomeric polymer film having a high degree of resiliency in a direction normal to the plane of the film, an intermediate layer of a thin, non-elastic polymer film bonded to the base layer, and an inking layer bonded to the intermediate layer over substantially its entire working surface and comprising a substantially continuous film of a microporous inking composition. The microporous inking composition consists essentially of a uniformly blended mixture of an elastomeric polymeric binder, an inking compound comprising a non-aqueous, non-volatile ink carrier which is substantially insoluble in the elastomeric polymeric binder and which contains a high concentration of an ink pigment, and a finely ground microporous inorganic filler. Other patents, such as U.S. Pat. No. 3,287,153, U.S. Pat. No. 3,392,042, U.S. Pat. No. 3,484,508, U.S. Pat. No. 3,930,099, U.S. Pat. No. 4,321,286, U.S. Pat. No. 4,544,292, and U.S. Pat. No. 4,624,881, also disclose pressure sensitive porous marking ribbons filled with an exudable marking material. Of general interest is U.S. Pat. No. 2,940,847, which discloses improved methods and means for color electrophotography and includes transfer imaging using electromagnetic energy augmented by an electric field. In addition, U.S. Pat. Nos. 3,351,948, 3,847,265, 4,251,276, 4,414,555, 4,415,903, 4,603,986, 4,608,577, 4,762,734, 3,480,962, 4,128,345, 4,205,320, and 4,315,267 are of background interest.

Although the prior art processes are suitable for their intended purposes, a need continues to exist for improved thermal transfer printing processes. A need also exists for thermal transfer printing processes employing multi-use transfer elements in which the amount of ink released from the transfer elements is metered by means of a field. In addition, a need exist for thermal transfer printing processes that enable formation of images within a gray scale of image density. Further, a need exists for thermal transfer printing processes in which printing speed is augmented or enhanced by field assist. A need also exists for thermal transfer printing processes that enable the formation of high quality images on rough paper or other rough receiver sheets. An additional need exists for thermal transfer printing processes enhanced by field assist to enable formation of images wherein the solid areas are of uniform image density. Further, there is a need for thermal transfer printing processes enhanced by field assist to enable the formation of machine-readable magnetic characters.

SUMMARY OF THE INVENTION

It is an object of the present invention to provide an improved thermal transfer printing process.

It is another object of the present invention to provide a thermal transfer printing process employing a multi-use transfer element in which the amount of ink released from the element is metered by means of a field.

It is yet another object of the present invention to provide a thermal transfer printing process that enables formation of images within a gray scale of image density.

It is still another object of the present invention to provide a thermal transfer printing process in which printing speed is augmented or enhanced by field assist.

Another object of the present invention is to provide a thermal transfer printing process that enables the formation of high quality images on rough paper or other rough receiver sheets.

Yet another object of the present invention is to provide a thermal transfer printing process enhanced by field assist to enable formation of images wherein the solid areas are of uniform image density.

Still another object of the present invention is to provide a thermal transfer printing process enhanced by field assist to enable the formation of machine-readable magnetic characters.

These and other objects of the present invention are achieved by providing a thermal transfer printing process which comprises incorporating into a thermal transfer printing apparatus with a thermal printhead a transfer element comprising a substrate upon which is contained an ink, contacting the transfer element with a receiver sheet, applying heat imagewise from the printhead to the transfer element, and applying a field between the transfer element and the receiver sheet to enhance imagewise transfer of the ink from the transfer element to the receiver sheet. The applied field can be either electric or magnetic in nature, and for the purposes of this invention, the term "field" refers to an electric or a magnetic field.

Field assisted thermal transfer printing can be performed in a variety of ways. According to one method, a magnetic material such as magnetite is incorporated into the ink composition contained on the transfer element and a magnet is placed behind the receiving sheet to attract the ink to the receiving sheet, thus facilitating transfer of the ink from the transfer element to the receiver sheet. The magnet can be a permanent magnet, or it can be an electromagnet wherein the magnetic field strength is capable of being modulated by altering the current. Another possible magnet configuration is to provide both a permanent magnet and an electromagnet, thereby allowing for some degree of modulation of the magnetic field.

Another method of field assist comprises providing an electric field for the purpose of enhancing transfer of the ink from the transfer element to the receiver sheet. When the ink composition is conductive as a result of its containing a material such as carbon black or other conductive substances, one electrode is placed behind the receiver sheet and another electrode behind the transfer element. Voltage is applied between the electrodes to create a bias, which results in the conductive ink jumping from the transfer element to the receiver sheet. When the ink composition is insulating, a charging device such as an electrode or a corotron or a combination thereof is employed to generate a charge on the surface of the receiver sheet. The transfer element is uniformly precharged to an opposite polarity by any suitable means, such as an electrode or a corotron or a combination thereof. The electric field generated between the receiver sheet and the transfer element then draws the ink to the receiver sheet.

DETAILED DESCRIPTION OF THE PREFERRED EMBODIMENTS

Figure 1:
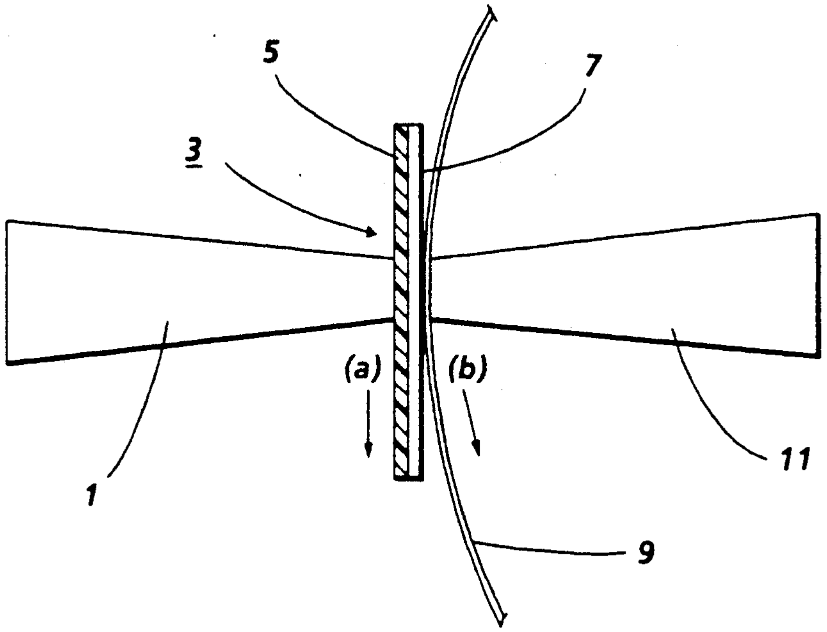
FIG. 1 is a schematic representation of a thermal transfer printing apparatus having a magnet situated behind the receiver sheet to attract ink from the transfer element onto the receiver sheet.

A method of enhancing the thermal transfer printing process by means of a magnetic field assist is shown schematically in FIG. 1. The process entails providing a thermal transfer printing apparatus containing a thermal printhead 1 to deliver heat to a transfer element 3 moving in the direction of the arrow (a). The transfer element comprises a supporting substrate layer 5 and a layer containing the ink 7. A receiving sheet 9 moving in the direction of the arrow (b) is placed in intimate contact with transfer element 3 at the point at which printhead 1 delivers heat imagewise to the transfer element 3. Within the ink layer 7 is contained a magnetic material such as magnetite. A magnet 11 is placed behind receiving sheet 9 to attract the ink 7 containing the magnetic material from the transfer element 3 to the receiving sheet 9, thereby enhancing the transfer of ink 7 from transfer element 3 to receiver sheet 9.

The magnet employed to enhance transfer by attracting the ink can be a permanent magnet that generates a magnetic field of constant strength. No necessity exists for applying the magnetic field imagewise in most printing applications; thus, a single permanent magnet would suffice for enhancing the transfer process in many instances. If modulation of the strength of the magnetic field is desired, the permanent magnet can be mounted such that it is capable of being moved toward or away from the receiving sheet, thereby strengthening or weakening the effective field experienced by the receiving sheet, since the strength of the field varies with the inverse of the distance from the magnet squared. Modulation of the magnetic field strength may be desirable for purposes such as altering print density or decreasing background deposits in images formed by a thermal transfer process enhanced by the field.

An electromagnet, for which the magnetic field is generated by means of electric current, is also suitable for enhancing ink transfer. Although a magnet of this type has the disadvantage of requiring electrical energy to operate whereas the permanent magnet has no such requirement, the electromagnet has the advantage of being easily modulated with respect to the strength of the magnetic field generated. An electromagnet is easily and smoothly modulated by adjusting the amount of current supplied to it, and the magnetic field strength can be varied over a wide range of zero field to maximum field.

A third possible configuration for the magnet is a combination of a permanent magnet with an electromagnet. This option combines the advantages of the permanent magnet, which include enablement of a printer with lower power requirements, a smaller power supply, and less heat generation, with those of an electromagnet, which include easy and smooth modulation of field strength and the ability to reverse the direction of the field. In operation, a printer containing this combination of permanent magnet and electromagnet can, if desired, operate by employing only the permanent magnet for most printing operations, and employing the electromagnet only when an increase or decrease of the strength of the magnetic field is desired.

When magnetic field assist is chosen, the intrinsic induction range of the magnet is of an effective magnitude to achieve the desired result of enhancing transfer of the ink from the transfer medium to the substrate. Typically, the intrinsic induction range of the magnet is from about 1 to about 25 kilogauss, although it can be outside of this range.

Thermal transfer printing processes enhanced by a magnetic field assist employ an ink composition containing a magnetic material, such as a magnetite, metal oxides such as FeO or $Fe_2O_3$, and the like, any ferromagnetic material, or the like, as well as mixtures thereof. The magnetic material is present in the ink composition in an effective amount, typically from about 1 percent by weight to about 90 percent by weight, although amounts in excess of 10 percent by weight of the ink composition generally provide no additional benefits with respect to enhanced ink transfer. The amount of magnetic material generally is determined in terms of economic desirability; for example, when a black ink is desired, carbon black and magnetite can be chosen as the colorants, and the magnetite can be present in a large amount relative to the carbon black if magnetite is less expensive than carbon black. In addition, large amounts of magnetic material in the ink, for example, amounts of about 30 percent by weight or greater, may be desirable if the printed image is intended to be magnetically readable in applications such as magnetic bar codes or magnetic check code reading. One specific example of a suitable ink comprises a colorant such as Regal® 99R carbon black, from Cabot Corporation, in an amount of about 12 percent by weight, a magnetic material such as Mapico Black magnetite in an amount of about 1 percent by weight, paraffin wax such as Paraffin 1230, available from International Waxes Ltd., in an amount of about 38 percent by weight, synthetic beeswax in an amount of about 30 percent by weight, a dispersing agent, such as Petrolite WB14, available from Petrolite Corporation, in an amount of about 5 percent by weight, an ethylene-vinyl acetate copolymer such as Elvax® 410, available from E. I. Du Pont de Nemours and Company, in an amount of about 12 percent by weight, and a polyethylene wax, such as Epolene C10, available from Eastman Kodak Company, in an amount of about 2 percent by weight. Another specific example of a suitable ink comprises a magnetic colorant such as Mapico Black magnetite, in an amount of about 13 percent by weight, paraffin wax such as Paraffin 1246, available from International Waxes Ltd., in an amount of about 40 percent by weight, natural beeswax in an amount of about 32 percent by weight, a dispersing agent, such as Petrolite WB14, available from Petrolite Corporation, in an amount of about 5 percent by weight, an ethylene-vinyl acetate copolymer such as Elvax® 410, available from E. I. Du Pont de Nemours and Company, in an amount of about 6 percent by weight, a polyethylene wax, such as Epolene C10, available from Eastman Kodak Company, in an amount of about 2 percent by weight, and an additional wax, such as Carnauba #1 yellow wax, in an amount of about 2 percent by weight. Still another specific example of a suitable ink comprises a magnetic colorant such as Mapico Black magnetite, in an amount of about 35 percent by weight, paraffin wax such as Paraffin 1246, available from International Waxes Ltd., in an amount of about 37 percent by weight, natural beeswax in an amount of about 20 percent by weight, a dispersing agent, such as Petrolite WB14, available from Petrolite Corporation, in an amount of about 3 percent by weight, an ethylene-vinyl acetate copolymer such as Elvax® 410, available from E. I. Du Pont de Nemours and Company, in an amount of about 3 percent by weight, a polyethylene wax, such as Epolene C10, available from Eastman Kodak Company, in an amount of about 1 percent by weight, and additional wax, such as Carnauba #1 yellow wax, in an amount of about 1 percent by weight. Transfer elements with inks of this type can be made by any suitable process, such as by heating and mixing the ingredients to obtain a uniform homogeneous mixture and hot melt coating or solvent coating the mixture onto a suitable substrate, such as Mylar® polyester or the like. Similarly, these inks can be incorporated into a multi-use transfer medium.

Figure 2:
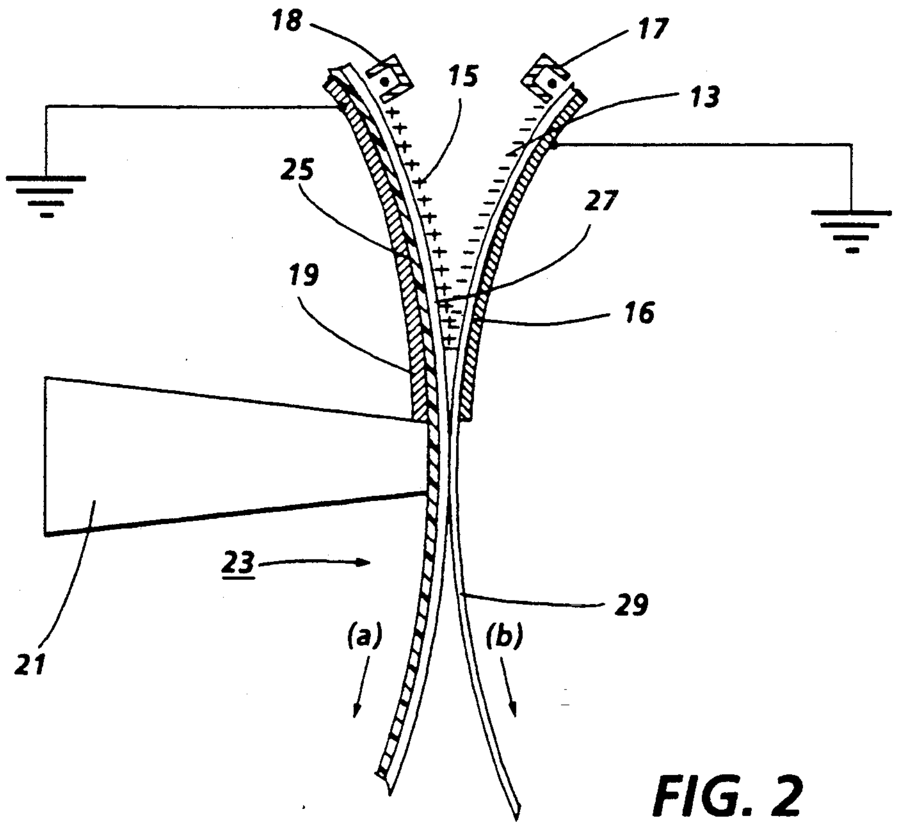
FIG. 2 is a schematic representation of a thermal transfer printing apparatus wherein the transfer element is charged oppositely to the receiver sheet, generating an electric field that draws the insulating ink from the transfer element to the receiver sheet.

A method of enhancing the thermal transfer printing process by means of an electric field assist is shown schematically in FIG. 2. The process entails providing a thermal transfer printing apparatus containing a thermal printhead 21 to deliver heat to a transfer element 23 moving in the direction of the arrow (a). The transfer element comprises a supporting substrate layer 25 and a layer containing the ink 27. A receiving sheet 29 moving in the direction of the arrow (b) is placed in intimate contact with transfer element 23 at the point at which printhead 21 delivers heat imagewise to the transfer element 23. Ink contained in ink layer 27 is insulating. A charging device 17, which can be a corotron, a blade, a conductive fabric, or any other suitable contact or noncontact charging means, is situated on one side of receiving substrate 29 to generate thereon a charge 13, and a first backing electrode 16 is optionally situated on the opposite side of receiving substrate 29. While not required, the backing electrode 16 can assist in forming and maintaining charge on the substrate 29. The backing electrode 16 is connected to a potential of lesser magnitude than the potential generated by charging device 17 (i.e., less positive when charging means 17 generates positive charge and less negative when charging means 17 generates negative charge), such as a ground. Although shown as a negative charge in FIG. 2, charge 13 can be either positive or negative. Transfer element 23 is uniformly precharged to a charge 15 having a polarity opposite to charge 13 on receiver sheet 29; although shown as a positive charge in FIG. 2, charge 15 can be either positive or negative, provided that it is opposite in polarity to charge 13. Precharging of transfer element 23 is performed by charging means 18, which can be a device such as a corotron, a blade, a conductive fabric, or any other suitable contact or noncontact charging means at a point before transfer element 23 comes into contact with printhead 21 and receiving sheet 29. Optionally, a second backing electrode 19 is situated behind transfer element 23 to assist in forming and maintaining charge on transfer element 23. The backing electrode 19 is connected to a potential of lesser magnitude than the potential generated by charging device 18 (i.e., less positive when charging means 18 generates positive charge and less negative when charging means 18 generates negative charge), such as a ground. A field generated between receiving sheet 29, having charge 13, and transfer element 23, having charge 15, draws ink from ink layer 27 to receiving sheet 29.

When field assist is performed according to the method illustrated in FIG. 2, the ink composition is generally insulating. Any effective resistivity value of the ink is acceptable provided that the objectives of the invention are achieved; typically, the insulating ink has a restivity of from about $10^9$ to about $10^{16}$ ohm-cm. Typical ink compositions suitable for this embodiment of the present invention generally comprise a nonconductive colorant and nonconductive wax components. One specific example of a suitable ink comprises a nonconductive colorant such as Regal ® 99R carbon black, available from Cabot Corporation, in an amount of about 13 percent by weight, paraffin wax such as Paraffin 1230, available from International Waxes Ltd., in an amount of about 38 percent by weight, synthetic beeswax in an amount of about 30 percent by weight, a dispersing agent, such as Petrolite WB14, available from Petrolite Corporation, in an amount of about 5 percent by weight, an ethylene-vinyl acetate copolymer such as Elvax ® 410, available from I. E. Du Pont de Nemours and Company, in an amount of about 12 percent by weight, and a polyehtylene wax, such as Epolene C10, available from Eastman Kodak Company, in an amount of about 2 percent by weight. Another specific example of a suitable ink comprises a nonconductive colorant such as Regal ® 99R carbon black, available from Cabot Corporation, in an amount of about 13 percent by weight, paraffin wax such as Paraffin 1246, available from International Waxes Ltd., in an amount of about 40 percent by weight, natural beeswax in an amount of about 32 percent by weight, a dispersing agent, such as Petrolite WB14, available from Petrolite Corporation, in an amount of about 5 percent by weight, an ethylene-vinyl acetate copolymer such as Elvax ® 410, available from E. I. DuPont de Nemours and Company, in an amount of about 6 percent by weight, a polyethylene wax, such as Epolene C10, available from Eastman Kodak Company, in an amount of about 2 percent by weight, and an additional wax, such as Carnauba #1 yellow wax, in an amount of about 2 percent by weight. Still another specific example of a suitable ink comprises a nonconductive colorant such as Regal ® 99R carbon black, available from Cabot Corporation, in an amount of about 11 percent by weight, paraffin wax such as Paraffin 1246, available from International Waxes Ltd., in an amount of about 51 percent by weight, natural beeswax in an amount of about 27 percent by weight, a dispersing agent, such as Petrolite WB14, available from Petrolite Corporation, in an amount of about 4.5 percent by weight, an ethylene-vinyl acetate copolymer such as Elvax ® 410, available from E. I. DuPont de Nemours and Company, in an amount of about 4.5 percent by weight, a polyethylene wax, such as Epolene C10, available from Eastman Kodak Company, in an amount of about 1 percent by weight, and an additional wax, such as Carnauba #1 yellow wax, in an amount of about 1 percent by weight. Transfer elements with inks of this type can be made by any suitable process, such as by heating and mixing the ingredients to obtain a uniform homogeneous mixture and hot melt coating or solvent coating the mixture onto a suitable substrate, such as Mylar ® polyester or the like. Similarly, these inks can be incorporated into a multi-use transfer medium. These inks and similar inks can also be employed for the embodiment of the present invention illustrated in FIG. 1, which employs a magnetic field to assist transfer, by incorporating into the ink formulation the magnetic material in the desired amount.

Figure 3:
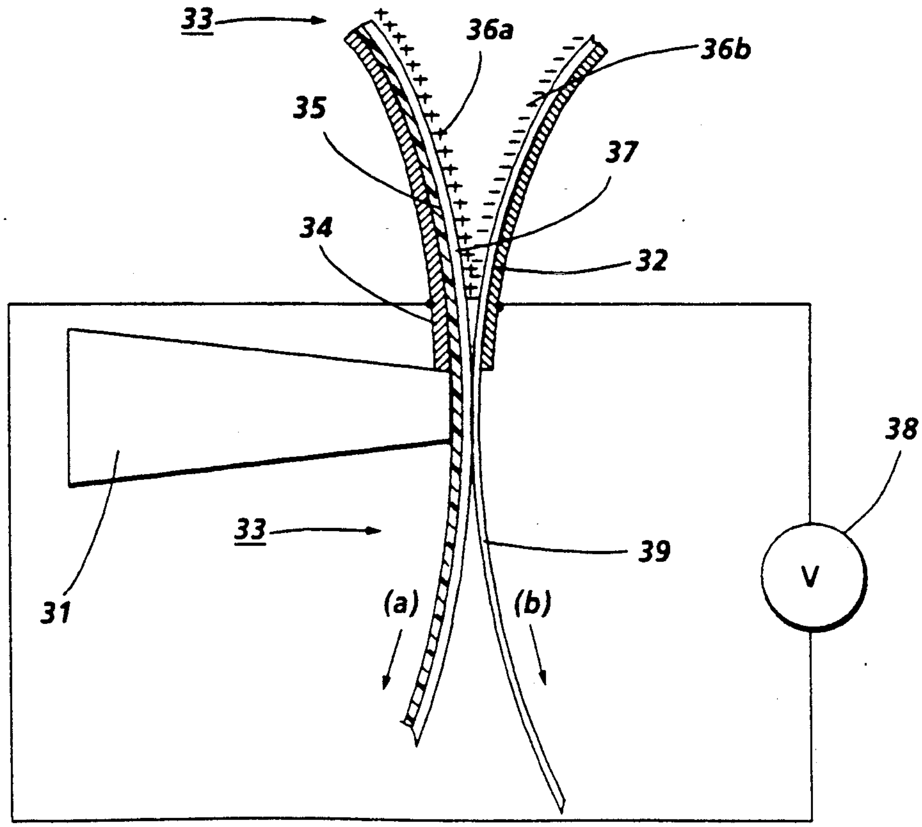
FIG. 3 is a schematic representation of a thermal transfer printing apparatus wherein electrodes are situated behind the transfer element and the receiver sheet. Voltage applied between the electrodes generates an electric field that draws the conductive ink from the transfer element to the receiver sheet.

Another method of enhancing the thermal transfer printing process by means of an electric field assist is shown schematically in FIG. 3. The process entails providing a thermal transfer printing apparatus containing a thermal printhead 31 to deliver heat to a transfer element 33 moving in the direction of the arrow (a). The transfer element comprises a supporting substrate layer 35 and a layer containing the ink 37. A receiving sheet 39 moving in the direction of the arrow (b) is placed in intimate contact with transfer element 33 at the point at which printhead 31 delivers heat imagewise to the transfer element 33. Ink contained in ink layer 37 is conductive. An electrode 32 is situated behind receiving sheet 39, and another electrode 34 is situated behind transfer element 33. Voltage is applied between electrodes 32 and 34 to generate a bias, which causes the conductive ink in ink layer 37 to jump from transfer element 33 to receiving sheet 39. Charge 36a and 36b is induced between conductive ink 37 and receiving sheet 39 by bias voltage source 38. Any effective voltage can be applied; typical voltages range from about 100 to about 2,000 volts per centimeter.

When field assist is performed according to the method illustrated in FIG. 3, the ink composition is typically conductive. The ink can be any suitable ink formulation having a conductivity sufficient to enhance transfer of the ink to the substrate, with typical conductivities being from about 40 to about 150 picomhos. For example, the insulating ink formulations described herein can be modified by, for example, substituting a conductive colorant such as conductive carbon black, including Raven ® 5250, Printex 150T, Sudan Blue OS, or the like, or a phthalocyanine pigment or dye, for the insulating colorant, or by adding a conductivity enhancing component, such as iron naphthenate; lecithin (Fisher Inc.); OLOA 1200, a polyisobutylene succinimide available from Chevron Chemical Company; basic barium petronate (Witco Inc.); zirconium octoate (Nuodex); cobalt octoate; aluminum stearate; salts of calcium, manganese, magnesium and zinc and heptanoic acid; salts of barium, aluminum, cobalt, manganese, zinc, cerium, and zirconium octoates; salts of barium, aluminum, zinc, copper, lead, and iron with stearic acid; mixtures thereof; or the like to the ink formulation in an effective amount, generally from about 1 to about 40 percent by weight, or the like. One specific example of a suitable conductive ink composition comprises a conductive colorant such as Raven 5250 conductive carbon black, in an amount of about 13 percent by weight, paraffin wax such as Paraffin 1230, available from International Waxes Ltd., in an amount of about 33 percent by weight, a conductivity enhancing additive such as OLOA 1200, available from Chevron Chemical Company, in an amount of about 5 percent by weight, synthetic beeswax in an amount of about 30 percent by weight, a dispersing agent, such as Petrolite WB14, available from Petrolite Corporation, in an amount of about 5 percent by weight, an ethylene-vinyl acetate copolymer such as Elvax ® 410, available from E. I. DuPont de Nemours and Company, in an amount of about 12 percent by weight, and a polyethylene wax, such as Epolene C10, available from Eastman Kodak Company, in an amount of about 2 percent by weight. Another specific example of a suitable ink comprises a conductive colorant such as Raven ® 5250 conductive carbon black, in an amount of about 13 percent by weight, paraffin wax such as Paraffin 1246, available from International Waxes Ltd., in an amount of about 35 percent by weight, a conductivity enhancing additive such as OLOA 1200, available from Chevron Chemical Company, in an amount of about 5 percent by weight, natural beeswax in an amount of about 32 percent by weight, a dispersing agent, such as Petrolite WB14, available from Petrolite Corporation, in an amount of about 5 percent by weight, an ethylene-vinyl acetate copolymer such as Elvax ® 410, available from E. I. DuPont de Nemours and Company, in an amount of about 6 percent by weight, a polyethylene wax, such as Epolene C10, available from Eastman Kodak Company, in an amount of about 2 percent by weight, and an additional wax, such as Carnauba #1 yellow wax, in an amount of about 2 percent by weight. Still another specific example of a suitable ink comprises a conductive colorant such as Raven ® 5250 conductive carbon black, in an amount of about 11 percent by weight, paraffin wax such as Paraffin 1246, available from International Waxes Ltd., in an amount of about 45 percent by weight, a conductivity enhancing additive such as OLOA 1200, available from Chevron Chemical Company, in an amount of about 6 percent by weight, natural beeswax in an amount of about 27 percent by weight, a dispersing agent, such as Petrolite WB14, available from Petrolite Corporation, in an amount of about 4.5 percent by weight, an ethylene-vinyl acetate copolymer such as Elvax ® 410, available from E. I. DuPont de Nemours and Company, in an amount of about 4.5 percent by weight, a polyethylene wax, such as Epolene C10, available from Eastman Kodak Company, in an amount of about 1 percent by weight, and an additional wax, such as Carnauba #1 yellow wax, in an amount of about 1 percent by weight. Transfer elements with inks of this type can be made by any suitable process, such as by heating and mixing the ingredients to obtain a uniform homogeneous mixture and hot melt coating or solvent coating the mixture onto a suitable substrate, such as Mylar ® polyester or the like. Similarly, these inks can be incorporated into a multi-use transfer medium.

Field assist enhances thermal transfer printing processes employing multi-use transfer elements, such as those in which the ink is contained in a fabric or a gravure-like applicator or those described in copending application U.S. Ser. No. 454,800, by regulating the amount of ink transferred from the transfer element to the receiver sheet. Obtaining the maximum possible number of overstrikes from a multi-use transfer element requires that only the required amount of ink be released from the element for each use so that the remaining ink is retained in the transfer element for use in subsequent imaging cycles. Modulating the strength of the electric or magnetic field controls the amount of ink transferred, thereby enabling conservation of ink. Modulating the field strength also provides a method of enabling uniform image density throughout the lifetime of the multi-use transfer element, since the field strength can be adjusted to provide more field assistance as the transfer element encounters repeated use and gradually contains less ink.

Figure 6:
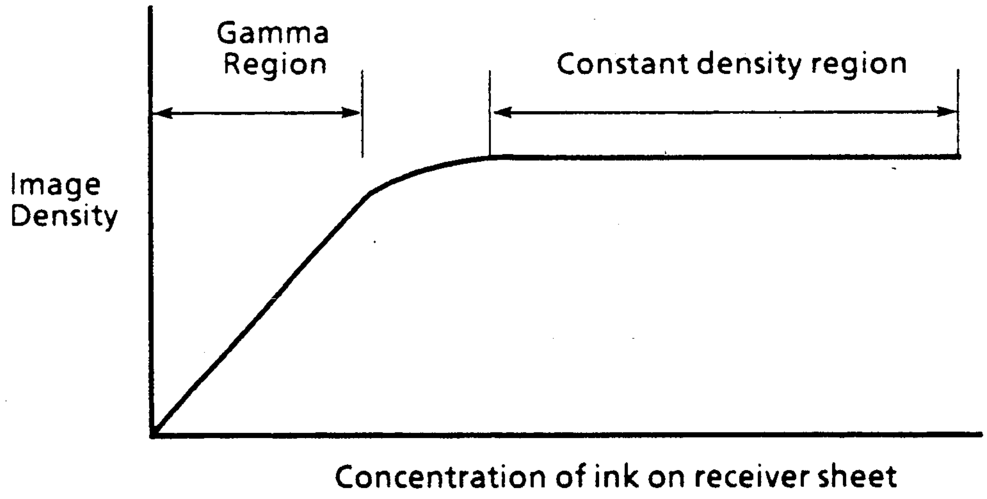
FIG. 6 represents a graph showing the relationship between image density and the amount of ink applied to a substrate to form an image.

Field assisted thermal transfer printing according to the present invention and employing a multi-use transfer element also enables the printing of images within a "gray scale". By gray scale, it is meant that the image density can be varied along a continuum from zero image density to maximum image density. Image density is a function of the concentration of ink on the receiver sheet, and is expressed by the Kubelka-Munk expression, as disclosed in "Recent Developments in Graphic Arts Research," W. H. Banks, Ed., Vol 6 of Advances in Printing Science and Technology, Pergammon Press, 1971. The relationship between image density and ink delivered to paper is as shown in FIG. 6. In the gamma region, image density increases with increasing ink concentration. Above a certain ink concentration, however, additional ink does not improve image density, as represented by the constant density region in the FIG. 6. Operation of a thermal transfer printer with a multi-use transfer element within the constant density region is suitable for line copy and monochrome printing, provided that ink concentration is not maintained at so high a level that the transfer element is exhausted too rapidly or the pile height of the image on the receiver sheet is unacceptably high. Control or regulation of the amount of ink released from the transfer element of the present invention within the gamma region thus allows for gray scale control of the image printed.

The requisite control of ink released to generate images having image density within a gray scale can be accomplished by modulating the electric or magnetic field in a field assisted printing process as described herein. For most thermal transfer printing applications performed according to the present invention, imagewise application of the magnetic or electric field is not necessary to form images; the field is applied to the entire imaging region of the transfer element, and heat is applied imagewise to the transfer element. The applied field has an effect only on those portions of the ink that have undergone a transition such as melting as a result of the imagewise application of heat from the printhead, and the unimaged areas of the transfer element remain unaffected. When gray scale printing is desired, however, imagewise application of the field to the transfer element can be desirable, since the thermal printhead will deliver heat to all areas in which an image is to be formed and the applied field will regulate the amount of ink delivered to the receiver sheet, thereby generating an image with shades of gray. Examples of suitable apparatuses for delivering the field imagewise to the transfer element are shown in FIGS. 4 and 5.

Figure 4:
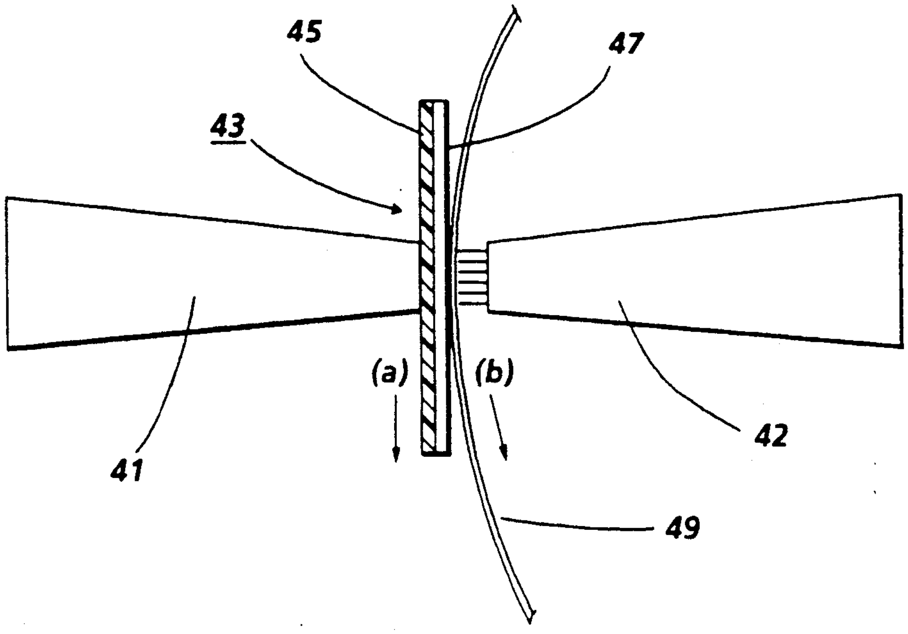
FIG. 4 is a schematic representation of a thermal transfer printing apparatus wherein a modulated magnetic field is applied in imagewise fashion between the heated transfer element and the receiver sheet, thereby enabling printing of gray scale images.

One method of imagewise enhancing the thermal transfer printing process by means of a magnetic field assist is shown schematically in FIG. 4. The process entails providing a thermal transfer printing apparatus containing a thermal printhead 41 to deliver heat to a transfer element 43 moving in the direction of the arrow (a). The transfer element comprises a supporting substrate layer 45 and a layer containing the ink 47. A receiving sheet 49 moving in the direction of the arrow (b) is placed in intimate contact with transfer element 43 at the point at which printhead 41 delivers heat imagewise to the transfer element 43. Within the ink layer 47 is contained a magnetic material such as magnetite. A magnetic stylus array 42 is placed behind receiving sheet 49 to attract the ink 47 containing the magnetic material from the transfer element 43 to the receiving sheet 49, thereby enhancing the transfer of ink 47 from transfer element 43 to receiver sheet 49. Magnetic sytlus array 42 applies a modulated magnetic field imagewise to receiver sheet 49. Modulation control can be either on-off or continuously variable.

The magnetic stylus array can be of any suitable configuration. For example, the magnetic stylus can be similar to those employed in some electrographic printing processes wherein a magnetically responsive toner is deposited directly on a dielectric receptor as a result of electronic current flow from an array of magnetically permeable styli into the toner chains formed on the tips of the styli. The styli themselves preferably are magnetically permeable and typically are arranged in a linear array. Continuous tone gray scale printing can be accomplished by either a digital duty cycle modulation or an analog voltage modulation as described by, for example, O. L. Nelson in "A Method for Direct Electronic Printing of Gray Scale Pictorial Information", 33rd Annual Conference, SPSE, May 4–9, 1980, Miinneapolis, Minn., the disclosure of which is totally incorporated herein by reference. Further information regarding magnetic styli and processes for employing magnetic styli is disclosed in, for example, U.S. Pat. No. 3,816,840 and U.S. Pat. No. 3,914,771, the disclosures of each of which are totally incorporated herein by reference.

Figure 5:
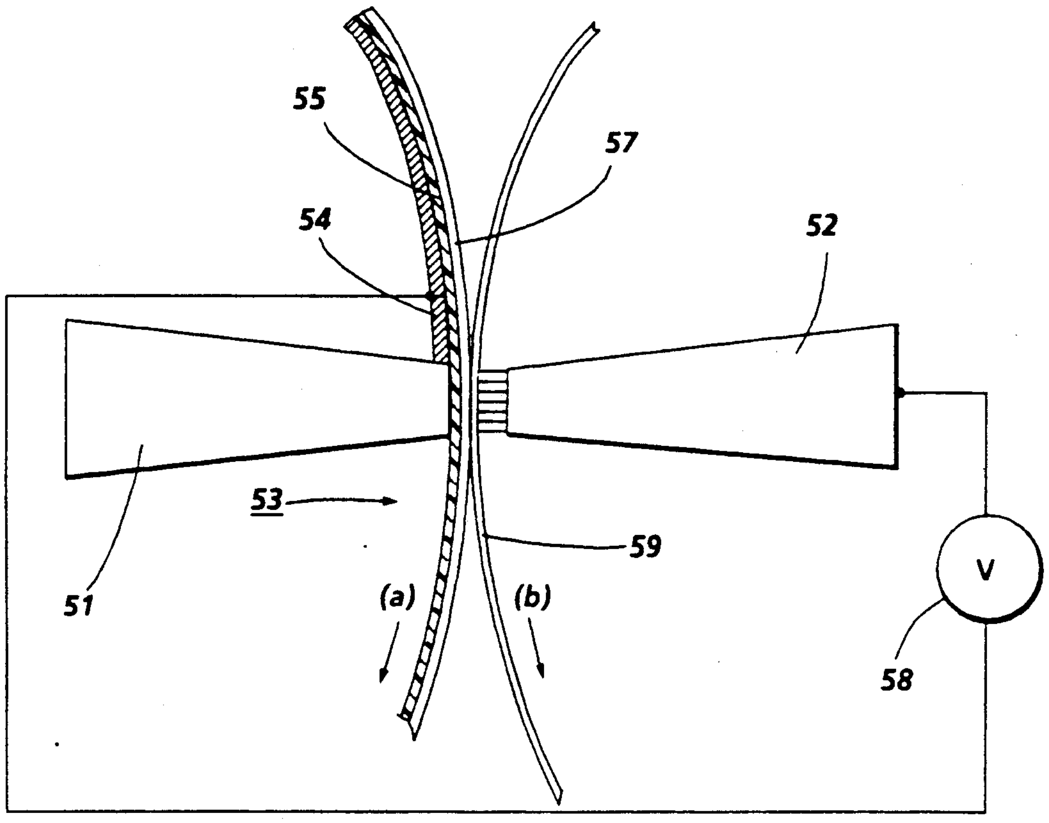
FIG. 5 is a schematic representation of a thermal transfer printing apparatus wherein a modulated electric field is applied in imagewise fashion between the heated transfer element and the receiver sheet, thereby enabling printing of gray scale images.

A method of imagewise enhancing the thermal transfer printing process by means of a modulated electric field assist is shown schematically in FIG. 5. The process entails providing a thermal transfer printing apparatus containing a thermal printhead 51 to deliver heat to a transfer element 53 moving in the direction of the arrow (a). The transfer element comprises a supporting substrate layer 55 and a layer containing the ink 57. A receiving sheet 59 moving in the direction of the arrow (b) is placed in intimate contact with transfer element 53 at the point at which printhead 51 delivers heat imagewise to the transfer element 53. Ink contained in ink layer 57 is conductive. An electric stylus array 52, such as those employed in electrostatic or electrographic printing and disclosed in, for example, U.S. Pat. Nos. 4,731,622; 4,485,982; 4,569,584; 3,611,419; 4,240,084; 3,564,556; 3,937,177; 3,729,123 and 3,859,960, the disclosures of each of which are totally incorporated herein by reference, is situated behind receiving sheet 59, and an electrode 54 is situated behind transfer element 53. A pulsed modulated voltage is applied from bias voltage source 58 between electrode 54 and electric stylus array 52 to generate a modulated bias which causes the conductive ink in ink layer 57 to jump from transfer element 53 to receiving sheet 59. Modulation control can be either on-off or continuously variable. Any effective voltage can be applied; typical voltages range from about 100 to about 2,000 volts per centimeter.

Ink compositions and thermal transfer elements suitable for magnetically enhanced thermal transfer printing processes include most known thermal transfer inks, modified if necessary as described herein to include a magnetic or conductive material. Examples of suitable ink compositions are described in, for example, copending applications U.S. Ser. No. 454,800 and U.S. Ser. No. 454,817, the disclosures of each of which are totally incorporated herein by reference. Additional examples of suitable thermal transfer inks and donor elements are disclosed in, for example, U.S. Pat. Nos. 4,762,734; 4,503,095; 3,970,002; 4,308,318 and 4,251,276, the disclosures of each of which are totally incorporated herein by reference. When a magnetic or conductive component is added to the ink, this component of the ink is mixed with the other ink ingredients during the ink formulation process and the ink and transfer element are prepared by conventional methods as set forth, for example, in the aforementioned references.

Multi-use transfer elements are suitable for the processes of the present invention, and are particularly suitable for those embodiments wherein a modulated magnetic or electric field is employed to form grayscale images. Multi-use thermal transfer elements suitable for the present invention typically comprise a substrate and an ink-filled porous layer. The substrate can be of any suitable material, such as paper, glassine, polyester (Mylar ®), polycarbonates, polyimides, polyamides, polyvinyl fluoride (Tedlar ®), polyethers such as polyaryl ethers, polysulfones, poly-α-olefins, regenerated celluloses, and the like. To alleviate the potential problem of the substrate adhering to the printhead, the substrate can be coated, on the side in contact with the heater and farthest from the receiver sheet, with a release coating. Particularly preferred is a substrate of aluminized Mylar ®, which consists of a layer of the Mylar ® coated with a layer of aluminum about 1000 Angstroms thick. The aluminum prevents adhesion of the substrate to the printhead and accompanying problems, such as tearing or stretching of the transfer element, and also enhances heat transfer between the printhead and the transfer element. Other coating materials include polyesters, polyamides, polyvinylchloride, polyvinylacetate, polyurethanes, polyolefins, polyvinyl alcohols, silicone oils, waxes, graphite, wax/polymer blends, mixtures thereof, and the like. The coating has an effective thickness, preferably from about 0.05 to 1 micron, although other thicknesses can be used.

Also preferred as substrates are condenser papers, also known as calendared papers, which are inexpensive, need no coating of a release material to prevent adhesion to the printhead, and also enhance heat transfer between the printhead and the transfer element. When a condenser paper substrate is present, an optional adhesive coating between the substrate and the sponge layer prevents delamination of the sponge layer from the substrate. This adhesive coating can be of a material such as a polyvinyl chloride/polyvinyl acetate copolymer, including VYHH, available from Union Carbide Corporation, a polyester soluble in common organic solvents, such as Vitel PE-222, available from Goodyear Corporation, a polyester such as DuPont ® 49000 polyester adhesive, and the like. The coating material can be solvent coated onto the substrate from methyl ethyl ketone or a similar solvent by any suitable means, such as draw-down knife coating or gapped blade coating, followed by evaporation of the solvent with or without the application of heat, resulting in a coating thickness preferably of from about 2 to about 3 microns.

In addition, substrates of materials such as a polycarbonate filled with carbon black, as described in "Resistive Ribbon Thermal Transfer Printing: A Historical Review and Introduction to a New Printing Technology," IBM J. Res. Develop., vol. 29, no. 5, pages 449 to 457 (1985), the disclosure of which is totally incorporated herein by reference, or other materials providing a suitable resistive heating base can be employed to permit use of thermal transfer elements in resistive heating thermal transfer printing, such as that performed in the IBM Quietwriter ® family of printers.

The substrate has an effective thickness, generally from about 2 microns to about 15 microns, and preferably about 3 microns, although the thickness can be outside this range. For printing processes employing electrical resistive heating processes, the substrate generally has a thickness of from about 6 to about 35 microns (¼ to ½ mil), although the thickness can be outside this range. Substrate thickness can be selected according to a variety of considerations. For example, thicker substrates are mechanically stronger than thinner substrates, and thus are less likely to tear or stretch when subjected to multiple heatings and windings. Thinner substrates have a lesser thermal burden than thick substrates, in that less heat is required to be applied to the substrate in order to effect transfer of the ink to the receiver sheet. In addition, thinner substrates enable increased footage on rolls of the transfer element. Substrates with thicknesses in the stated range generally perform acceptably with respect to all of these considerations. Since the primary function of the substrate is to transport heat from the printhead to the ink layer, its properties typically are designed so that it possesses high intrinsic thermal conductivity in addition to possessing sufficient strength to provide support. In addition, the substrate preferably is formulated in a manner to withstand high printhead temperatures of about 300° C. for several milliseconds without melting, deforming, or charring.

The substrate is coated with a layer of porous ink-filled material to form a multi-use thermal transfer element. This layer comprises effective amounts of the sponge material and ink, generally from about 20 to about 80 percent by weight, preferably from about 20 to about 50 percent by weight, and more preferably about 30 percent by weight, of the sponge material, and generally from about 20 to about 80 percent by weight, preferably from about 50 to about 80 percent by weight, and more preferably about 70 percent by weight, of the ink, although the relative amounts of sponge material and ink can be outside of this range. Sponge materials having a high loading of the ink in the sponge are preferred, since such sponges will result in a transfer medium capable of several uses. Suitable sponge materials include copolymers of polyvinyl chloride and polyvinyl acetate, such as those commercially available from Union Carbide Corporation as VYHH and VYHD, polyesters, such as Vitel ® PE-222, commercially available from Goodyear Corporation, silicone polymers soluble in common organic solvents, polycarbonates, polysulfones, poly phenylene oxides and other organic polymers soluble in common solvents, urethanes, natural rubbers, synthetic rubbers, block copolymers of heat resistant monomers, such as alpha methyl styrene, which are soluble in common organic solvents, polyamides soluble in common organic solvents, such as Emerez ®, commercially available from Emery Industries, and the like. In addition, elastomeric materials, such as the silicone elastomer available from Dow Corning as Sylgard 182 or an abhesive elastomer such as polydimethylsiloxane, can be employed; these materials would contract upon heating, causing the ink to come to the surface of the porous layer in imagewise fashion and to transfer to the receiver sheet.

The porous layer is present in an effective thickness, generally from about 12 to about 25 microns, and preferably about 21 to 22 microns, although this layer can have a thickness outside of this range. A thicker sponge layer has desirable advantages in that the layer will be capable of holding more ink, thus enabling several uses of the medium. A porous layer of excessive thickness, however, will require more heat applied to the back of the medium to cause imagewise transfer of the ink to the receiver sheet, since the heat applied must pass through both the substrate and the porous layer. Transfer elements having a porous layer with a thickness in the aforementioned ranges are capable of multiple uses and do not present an excessive thermal burden.

Preferably, the ink compositions are formulated so that only a small amount of the ink is necessary to provide images with acceptable image density. Thus, the ink compositions preferably have high pigment or dye concentrations of from about 2 to about 25 percent by weight. Ink compositions suitable for the porous layer include four classes of materials, all of which undergo some change upon heating. This change preferably occurs in the temperature range of from about 40° to about 150° C., and more preferably from about 50° to about 65° C. to minimize blocking and thermal burden, although the imaging temperature can be outside of this range if desired. One class of materials consists of liquid inks for which the viscosity decreases upon being heated from room temperature, which is generally from about 15° C. to about 35° C., to the temperature generated by the printhead. For example, an ink of this type might have a viscosity of from about 50 centipoise to about 2,000 poise at room temperature, and a viscosity of from about 10 centipoise to about 200 poise upon being heated by the printhead to a temperature of, for example, from about 40° C. to about 150° C. The difference in the viscosity at room temperature and the viscosity at a temperature of from about 40° C. to about 150° C. is sufficient to allow the ink to flow from the porous sponge layer to the receiver sheet. Thermal transfer printing processes employing a thermal transfer element having a porous layer in which the pores are filled with this type of ink operate by heating the transfer element imagewise; the viscosity of the ink decreases in the heated areas, permitting the ink to transfer from the porous layer to the receiver sheet, thereby forming the image. Examples of inks of this type include those with liquid ink bases such as fatty oils, mineral oils, poly glycols, glycols, and the like, as well as mixtures thereof. Inks of this type also include a colorant, such as one or more pigments or dyes or mixtures thereof, in an effective amount, generally from about 2 to about 25 percent by weight.

Inks of the type that undergo a change in viscosity upon being heated can be prepared by any suitable method, such as by mixing and stirring the selected ingredients to obtain a uniform, homogeneous mixture.

A second class of materials suitable as inks for the porous layer consists of materials that undergo a first order phase change, such as melting from the solid state at room temperature to the liquid state upon being heated, typically to a temperature range of from about 40° C. to about 150° C., and preferably from about 50° C. to about 65° C., although the imaging temperature can be outside of this range if desired. Suitable materials generally exhibit a sharp melting point, melt to form a liquid with a relatively low viscosity of no more than about 5 poise, and, preferably, have the ability to increase in volume upon melting, which would force the ink to the surface of the sponge structure. Thermal transfer printing processes employing a thermal transfer element having a porous layer in which the pores are filled with this type of ink operate by heating the ink containing element imagewise; the solid ink in the pores melts, enabling transfer of the ink to a receiver sheet. Upon resolidification of the ink, the ink adheres to the receiver sheet, thereby forming an image. Examples of inks of this type include ink bases such as crystalline wax based inks, saturated long-chain fatty acids with from about 12 to about 50 carbon atoms, saturated long-chain alcohols with from about 12 to about 50 carbon atoms, saturated long-chain esters with from about 12 to about 50 carbon atoms, and the like, as well as mixtures thereof. Inks of this type also include a colorant, such as one or more pigments or dyes or mixtures thereof, in an effective amount, generally from about 2 to about 25 percent by weight.

Inks of the type that undergo a first order phase change upon being heated can be prepared by any suitable method. For example, the ingredients can be heated to a temperature at which all components are liquid, followed by mixing and stirring the ink ingredients to obtain a uniform, homogeneous mixture.

A third class of suitable inks includes solid materials that undergo a second order phase change, such as a glass transition or softening upon being heated from room temperature by the printhead. This phase change can constitute either a transition from a glassy state to a liquid state, or a transition from a glassy state to a tacky state. In the situation involving the transition from a glassy state to a liquid state, images are formed as described herein for inks that typically undergo a first order phase change; the transfer element is imagewise heated, causing the ink to become glassy or softened and to transfer to the receiver sheet and form an image. In the situation involving the transition from a glassy state to a tacky state, imagewise heating of the transfer element causes the ink to become tacky and to adhere to the receiver sheet in imagewise fashion. Examples of inks of this type include those with ink bases such as rosin based polymers, low molecular weight polymers or oligomers with molecular weights of from about 200 to about 1,000 of materials such as polyolefins and substituted polyolefins, including halogenated polyethylenes such as Epolene C16, available from Eastman Kodak Company, copolymers of polyolefins, such as polyethylene/polyvinyl acetate copolymers, including the Elvax polymers available from E. I. DuPont Company, styrene-butadiene copolymers, styrene acrylate copolymers, styrene methacrylate copolymers, and the like, as well as mixtures thereof. Inks of this type also include a colorant, such as one or more pigments or dyes or mixtures thereof, in an effective amount, generally from about 2 to about 25 percent by weight.

Inks of the type that undergo a second order phase change upon being heated can be prepared by any suitable method. For example, the ingredients can be heated to a temperature at which all components are liquid, followed by mixing and stirring the ink ingredients to obtain a uniform, homogeneous mixture.

Another class of materials suitable as ink compositions for the present invention consists of those that undergo a mesomorphic phase change upon being heated by the printhead, such as liquid crystalline molecules and polymers. Ink compositions of this type are described in detail in copending application U.S. Ser. No. 454,817, (not yet assigned; D/87157, filed concurrently with this application), the disclosure of which is totally incorporated herein by reference. The phase change can constitute either a transition from the solid state to the smectic or nematic state, or a transition from the smectic or nematic state to the liquid state. Inks of this type include those containing azoxyanisoles, cholesterol derivatives, and the like, as well as mixtures thereof. Polymers exhibiting liquid crystalline behavior, such as polyurethanes, polycarbonates, polyesters, copolycarbonates, copolyesters, or the like, can also be employed. Examples of liquid crystalline materials are disclosed in, for example, U.S. Pat. Nos. 4,543,313; 4,617,371; 4,729,847; 4,774,160; 3,907,559; 3,732,119 and 4,394,498, the disclosures of which are totally incorporated herein by reference.

A typical ink composition capable of undergoing a mesomorphic phase change upon being heated can comprise from about 10 to about 75 percent by weight of the mesomorphic material, from about 2 to about 25 percent by weight of a colorant, including pigments, dyes, and combinations thereof, and from 0 to about 90 percent of additional ingredients, which can include an optional anti-oxidant such as BHA or BHT, present in an amount of from about 0.1 to about 0.5 percent by weight, an optional additive to prevent image smudging, such as a glycol, including polyethylene glycol, or polyethylene oxide, present in an amount of from about 10 to about 88 percent by weight, and, when the ink includes a pigment, a dispersant such as a surfactant, present in an amount of from about 1 percent to about 10 percent by weight. One example of a suitable dispersant is Sulfonated Hydrocarbons such as Petronate #9, available from Witco Chemical Company. The amount of the mesomorphic material depends on the compatibility of the mesomorphic material with the selected dye or pigment with respect to how well a selected dye is dissolved in the material or how well a selected pigment is suspended in the material. Since mesomorphic materials are often expensive, they can be diluted with similar molecules, such as fatty acids containing from about 12 to about 20 carbon atoms and preferably being saturated. Also suitable as diluents are unsaturated alcohols, esters of fatty acids, unsaturated fatty acids, and other similar materials having long carbon chains, to enhance compatibility with the liquid crystalline materials, and some degree of polarity, such as that provided by an —OH or —OR group to improve solubility of the diluent in the mesomorphic material. In addition, the amount of surfactant or anti-smudging agent can be increased so that these ingredients function as diluents in addition to their dispersant or anti-smudging functions.

A mesomorphic ink composition of this type can be prepared by blending all of the ingredients together at room temperature in the selected ink solvent in an attritor, a ball mill, or a high shear mixer, followed by mixing the solution with the other solution containing the sponge polymer, as described herein. Inks of this type frequently require less heat to induce the phase change than inks of the other classifications, and thus provide advantages in the thermal transfer printing process, such as enablement of faster printing and lowering of energy requirements.

The ink compositions present in the multi-use transfer elements contain a colorant, which can be a dye, a pigment, or a mixture of one or more dyes and/or one or more pigments. Colorants are present in effective amounts, generally from about 2 to about 25 percent by weight of the ink. Various pigments and dyes are suitable for the ink. Examples of suitable pigments and dyes include carbon black, nigrosine dye, aniline blue, 2,9-dimethyl-substituted quinacridone and anthraquinone dye, identified in the Color Index as Cl 60710, Cl Dispersed Red 15, a diazo dye identified in the Color Index as Cl 26050, Cl Solvent Red 19, copper tetra-4-(octadecyl sulfonamido) phthalocyanine, copper phthalocyanine pigment, listed in the Color Index as Cl 74160, Pigment Blue, and Anthradanthrene Blue, identified in the Color Index as Cl 69810, Special Blue X-2137, diarylide yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Foron Yellow SE/GLN, Cl Dispersed Yellow 33, 2,5-dimethoxy-4-sulfonanilide phenylazo-4'-chloro-2,5-dimethoxy acetoacetanilide, Permanent Yellow FGL, Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (American Hoechst), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow FG1 (Hoechst), Permanent Yellow YE 0305 (Paul Uhlich), Lumogen Yellow D0790 (BASF), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), Lithol Rubine D4566 (Lake) (BASF), Heliogen Blue NB D 7010 (BASF), and Sico Yellow NB D 1360 (BASF).

Ink compositions selected for multi-use thermal transfer elements preferably have a high concentration of colorant present, so that a small amount of the ink is sufficient to form an image of desired optical density. High colorant content in inks is often difficult to achieve because of the relatively low solubility of dyes in ink vehicles and the high viscosities associated with inks having high pigment loadings. Reactive dyes or basic dyes (those with a pH of over 7.0) that have been reacted with fatty acids to form dye salts, however, tend to exhibit significantly higher solubilities in ink vehicles than unreacted dyes. For example, reactive dyes or basic dyes unreacted with fatty acids typically exhibit solubilities of from about 1 to about 4 percent by weight in typical solvents or liquid vehicles, enabling ink compositions having the dye present in amounts of from about 0.3 to about 2 percent by weight. These same dyes, however, when reacted with a fatty acid such as oleic acid, stearic acid, palmitic acid, myristic acid, or linoleic acid, typically exhibit solubilities of from about 20 to about 50 percent by weight in the liquid vehicle or solvent, enabling ink compositions having the dye present in amounts of from about 5 to about 15 percent by weight. Dye salts of fatty acids are highly colored and exhibit excellent brightness and enable prints with unusually high print densities. In addition, inks containing dye salts of fatty acids exhibit excellent spreading and fixing qualities on receiver sheets, reduced susceptibility to thermally induced sublimation, and good transparency, which makes them suitable for printing on transparency material and for the formation of process color images. Suitable dyes for reaction with a fatty acid include the class of dyes known as reactive dyes and basic dyes with a pH of over 7.0. Particularly preferred are dyes such as Neptun Base Red 486 (BASF), Neptun Base Blue NB652 (BASF), Baso Yellow 124 (BASF), Neptun X60 (BASF), and the like.

Solid inks can be prepared by reacting one of the dyes listed above with a saturated fatty acid having from about 12 to about 50 carbon atoms, such as palmitic acid with 16 carbon atoms or stearic acid with 18 carbon atoms. Liquid inks can be prepared reacting one of the dyes listed above with an unsaturated fatty acid with from about 12 to about 30 carbon atoms, such as oleic acid with 18 carbon atoms and palmitoleic acid with 16 carbon atoms, and semisolid inks can be prepared by reacting one of the above dyes with a mixture of saturated and unsaturated fatty acids, wherein the ratio of saturated to unsaturated acid can vary from 0 percent saturated and 100 percent unsaturated to 100 percent saturated and 0 percent unsaturated. Inks containing these dye salts can be prepared by mixing the ingredients at from about 70° C. to about 95° C. and stirring. When liquid crystalline components are present in the inks, the inks containing the dye salts can be prepared by mixing the ingredients at room temperature, when liquid dye salts are present, or at about 70° C., when semisolid or solid dye salts are present.

The porous ink-filled layer of multi-use thermal transfer elements can be prepared by many methods. For example, a two solvent process can be employed, which process entails dissolving the polymeric sponge material in one solvent and the ink in another solvent. These solvents are chosen to be miscible with each other, and chosen so that the ink does not exhibit substantial solubility in the sponge solvent, and the sponge material does not exhibit substantial solubility in the ink solvent. The ink solvent is generally capable of evaporating at a lower temperature than the sponge solvent or has a lower boiling point than the sponge solvent at any given atmospheric pressure. A mixture is prepared by mixing a solution of the sponge material in its selected solvent with a solution of the ink in its selected solvent, with the sponge material and ink being present in relative amounts proportional to the ratio of ink to sponge desired in the coating. The mixture is then coated onto the substrate. Upon application of heat to the mixture, generally at a temperature equal to or greater than the boiling point of the ink solvent but lower than the boiling point of the sponge solvent, the ink solvent evaporates first, leaving ink droplets dispersed throughout the matrix of the sponge material in its solvent. Subsequently, the mixture is heated to a higher temperature, and the sponge solvent evaporates, which causes the polymeric sponge material to precipitate and form a solid structure around the ink droplets, resulting in a sponge containing ink droplets dispersed therein and adhering to the substrate.

Another suitable method of preparing the porous ink-filled layer is by ultraviolet polymerization of a multiphase system. An emulsion is prepared which comprises the ink composition and a monomer. This emulsion is coated onto the substrate, and the coated substrate is then exposed to ultraviolet light, which polymerizes the monomer in the emulsion, forming the polymeric sponge around the ink droplets.

A third method for preparing the porous ink-filled layer is by preparing a solution of the polymer sponge in a solvent and suspending in the solution a leachable material, such as a salt. The suspension is coated onto the substrate, and the solvent is evaporated, causing the polymeric material to precipitate and form a sponge material having the solid leachable material embedded therein. Subsequently, the sponge and substrate are soaked in water or another suitable material, causing the leachable material to leach from the sponge, leaving pores in the sponge where the solid particles once were. An inking operation can then be employed to place the ink composition into the pores. Such a process could comprise, for example, hot roll coating of the ink onto the sponge layer, followed by heating the transfer element to allow the ink to absorb into the sponge by capillary action.

Still another suitable process for preparing the porous ink-filled layer is to prepare a suspension of the polymeric sponge material in a solvent and suspending in the solution a liquid or solid blowing agent that will become gaseous upon heating to a temperature higher than that required to evaporate the solvent. The suspension is coated onto the substrate, and the solvent is evaporated, causing the polymeric material to precipitate and form a sponge material around the droplets or particles of the blowing material. Subsequent heating of the sponge and substrate causes the blowing agent to become gaseous, which "blows up" the sponge, forming pores therein. An inking operation, such as hot roll coating followed by heating, can then be employed to inject or apply the ink composition into the pores.

Pore size in the porous layer affects the rate at which ink will be released from the multi-use transfer element; smaller pores result in a transfer element from which the ink is released more slowly. The size of the pores is chosen according to the ink composition to be employed, since variables such as ink viscosity also affect the rate at which ink will be released from the transfer element. Generally, the rate of release should be as low as possible while still enabling images of the desired quality in order to conserve ink and permit the maximum number of uses of the transfer element. In general, the pore size ranges from about 0.5 to about 30 microns in average diameter, and preferably is from about 2 to about 5 microns in average diameter.

Pore size can be controlled by varying the ratio of the ink solvent to the sponge solvent in the two solvent coating process. Raising the amount of sponge solvent with respect to the amount of ink solvent results in the formation of smaller pores. For example, an ink-filled sponge can be prepared by the two solvent approach, wherein methyl ethyl ketone is the sponge solvent and toluene is the ink solvent. The ratio of methyl ethyl ketone can be varied from 50:50 to 60:40 to enable a sponge having smaller pores; by maintaining the ink to polymer ratio constant and adding more methyl ethyl ketone, the resulting pore size can be reduced. Adjusting the solids content within the solvents during the two solvent coating process also affects pore size. Generally, the solid materials are present in the solvent in an amount of about 25 percent by weight; raising the solids content in the solvents to about 50 percent by weight results in formation of smaller pores. In addition, the rate of evaporation of the solvents can affect pore size in that faster evaporation leads to larger pores. The rate of evaporation can be controlled by controlling the temperature and air flow during solvent evaporation, wherein faster air flow and/or higher temperature lead to faster evaporation. When the sponge is prepared by ultraviolet polymerization of a multiphase system, pore size can be adjusted by selection of the surfactant that emulsifies the ink, so that the ink droplets are of the desired size. For example, increasing the amount of surfactant present will increase the surface area between the ink and the sponge monomers, thereby leading to smaller ink droplets and smaller pores. When the sponge is prepared by leaching or blowing, the leaching or blowing agent can be selected to provide pores of the desired size. For example, large particles of the leaching agent or blowing agent will lead to large pores, whereas finely divided leaching or blowing agents will lead to small pores.

Regulation of ink release is particularly important in full color thermal transfer printing applications, where the amount of each colored ink released affects the color on the receiver sheet. In addition, pore size affects edge acuity of the image, in that large pores could result in an image having a scalloped edge and grainy solid areas. Ink release can also be controlled by regulating the viscosity of the ink, in that lower viscosity results in more ink being released. In addition, applying pressure to the transfer element will increase the amount and uniformity of ink released. Further, increasing the amount of ink present in the sponge will result in greater release of ink. Increasing the affinity of the ink for the substrate will also increase ink release; since paper substrates tend to have polar groups on the surface, addition of polar materials such as alcohols, including polyvinyl alcohol, materials such as polyvinyl acetate or polyethylene oxide, and similar polar materials will increase the ink's affinity for the paper and promote ink release.

The specific examples of embodiments of the present invention set forth herein are illustrative in nature, and the invention is not limited to the specific embodiments. Those skilled in the art will recognize variations and modifications that may be made which are within the scope of the following claims.

What is claimed is:

1. A thermal transfer printing process which comprises incorporating into a thermal transfer printing apparatus with a thermal printhead a transfer element comprising a substrate upon which is contained an ink, contacting the transfer element with a receiver sheet, applying heat imagewise from the printhead to the transfer element, and applying a field between the transfer element and the receiver sheet to enhance imagewise transfer of the ink from the transfer element to the receiver sheet, wherein the strength of the field is modulated to meter the amount of ink released from the transfer element.

2. A thermal transfer printing process according to claim 1 wherein the field applied between the transfer element and the receiver sheet is a magnetic field and the ink contains a magnetic material present in an amount of from about 1 to about 90 percent by weight of the ink.

3. A thermal transfer printing process according to claim 2 wherein the magnet is a permanent magnet.

4. A thermal transfer printing process according to claim 2 wherein the magnet is an electromagnet.

5. A thermal transfer printing process according to claim 2 wherein the magnetic field is generated by a combination of a permanent magnet and an electromagnet.

6. A thermal transfer printing process according to claim 2 wherein the strength of the magnetic field is modulated by altering the distance between the magnet and the receiver sheet.

7. A thermal transfer printing process according to claim 2 wherein the magnet comprises an electromagnet and the strength of the magnetic field is modulated by altering current flow through the electromagnet.

8. A thermal transfer printing process according to claim 7 wherein the magnetic field is generated by a combination of a permanent magnet and an electromagnet.

9. A thermal transfer printing process according to claim 2 wherein the magnetic material is present in an amount of from about 30 to about 90 percent by weight of the ink, thereby enabling images formed to be magnetically readable.

10. A thermal transfer printing process according to claim 1 wherein the ink contains a magnetic material present in an amount of from about 1 to about 90 percent by weight of the ink and the field applied between the transfer element and the receiver sheet is a magnetic field modulated in imagewise fashion to enable formation of images having image density within a gray scale.

11. A thermal transfer printing process which comprises incorporating into a thermal transfer printing apparatus with a thermal printhead a transfer element comprising a substrate upon which is contained an ink, contacting the transfer element with a receiver sheet, applying heat imagewise from the printhead to the transfer element, and applying a field between the transfer element and the receiver sheet to enhance imagewise transfer of the ink from the transfer element to the receiver sheet, wherein the ink is contained in a polymeric sponge material situated in a layer on the substrate, and wherein the strength of the field is modulated to meter the amount of ink released from the transfer element.

12. A thermal transfer printing process according to claim 11 wherein the field is applied imagewise to form images having image density within a gray scale.

13. A thermal transfer printing process according to claim 11 wherein the ink comprises a liquid crystalline material and a colorant.

14. A thermal transfer printing process according to claim 11 wherein the ink contains a dye salt resulting from the reaction of a dye and a fatty acid.

15. A thermal transfer printing process according to claim 11 wherein the field applied between the transfer element and the receiver sheet is an electric field.

16. A thermal transfer printing process according to claim 15 wherein the ink is conductive and the electric field is generated by situating the receiver sheet and the transfer element between a first electrode and a second electrode and applying voltage between the first and second electrodes to generate a bias, thereby attracting the ink from the transfer element to the receiver sheet.

17. A thermal transfer printing process according to claim 16 wherein the ink contains a conductive material present in an amount of from about 1 to about 40 percent by weight and is selected from the group consisting of conductive pigments, conductive dyes, and conductivity enhancing agents.

18. A thermal transfer printing process according to claim 17 wherein the conductive material is selected from the group consisting of conductive carbon black, phthalocyanine compounds, iron naphthenate, lecithin, polyisobutylene succinimide, basic barium petronate, aluminum stearate, salts of calcium and heptanoic acid, salts of manganese and heptanoic acid, salts of magnesium and heptanoic acid, salts of zinc and heptanoic acid, barium octoate, aluminum octoate, cobalt octoate, manganese octoate, zinc octoate, cerium octoate, zirconium octoate, salts of barium with stearic acid, salts of aluminum with stearic acid, salts of zinc with stearic acid, salts of copper with stearic acid, salts of lead with stearic acid, salts of iron with stearic acid, and mixtures thereof.

19. A thermal transfer printing process according to claim 15 wherein the ink is insulative and the electric field is generated by charging the receiver sheet with a first charging device and charging the transfer element to a polarity opposite to the charge on the receiver sheet with a second charging device, thereby generating an electric field between the transfer element and the receiver sheet which attracts the ink from the transfer element to the receiver sheet.

20. A thermal transfer printing process according to claim 19 wherein the first and second charging devices are charging electrodes.

21. A thermal transfer printing process according to claim 19 wherein the first and second charging devices are corotrons.

22. A thermal transfer printing process according to claim 21 wherein the receiver sheet is situated between the first charging device and a first backing electrode, and the transfer element is situated between the second charging device and a second backing electrode.

23. A thermal transfer printing process according to claim 11 wherein the field applied between the transfer element and the receiver sheet is a magnetic field and the ink contains a magnetic material present in an amount of from about 1 to about 90 percent by weight of the ink.

24. A thermal transfer printing process according to claim 23 wherein the magnet is a permanent magnet.

25. A thermal transfer printing process according to claim 23 wherein the magnet is an electromagnet.

26. A thermal transfer printing process according to claim 23 wherein the magnetic field is generated by a combination of a permanent magnet and an electromagnet.

27. A thermal transfer printing process according to claim 23 wherein the strength of the magnetic field is modulated by altering the distance between the magnet and the receiver sheet.

28. A thermal transfer printing process according to claim 23 wherein the magnet comprises an electromagnet and the strength of the magnetic field is modulated by altering current flow through the electromagnet.

29. A thermal transfer printing process according to claim 28 wherein the magnetic field is generated by a combination of a permanent magnet and an electromagnet.

30. A thermal transfer printing process according to claim 23 wherein the magnetic material is present in an amount of from about 30 to about 90 percent by weight of the ink, thereby enabling images formed to be magnetically readable.

31. A thermal transfer printing process according to claim 11 wherein the ink contains a magnetic material present in an amount of from about 1 to about 90 percent by weight of the ink and the field applied between the transfer element and the receiver sheet is a magnetic field modulated in imagewise fashion to enable formation of images having image density within a gray scale.

32. A thermal transfer printing process which comprises incorporating into a thermal transfer printing apparatus with a thermal printhead a transfer element comprising a substrate upon which is contained an ink, contacting the transfer element with a receiver sheet, applying heat imagewise from the printhead to the transfer element, and applying a field between the transfer element and the receiver sheet to enhance imagewise transfer of the ink from the transfer element to the receiver sheet, wherein the field applied between the transfer element and the receiver sheet is an electric field modulated in imagewise fashion to enable formation of images having image density within a gray scale.

33. A thermal transfer printing process which comprises incorporating into a thermal transfer printing apparatus with a thermal printhead a transfer element comprising a substrate upon which is contained an ink, contacting the transfer element with a receiver sheet, applying heat imagewise from the printhead to the transfer element, and applying an electric field between the transfer element and the receiver sheet to enhance imagewise transfer of the ink from the transfer element to the receiver sheet, wherein the ink is insulative and the electric field is generated by charging the receiver sheet with a first charging device and charging the transfer element to a polarity opposite to the charge on the receiver sheet with a second charging device, thereby generating an electric field between the transfer element and the receiver sheet which attracts the ink from the transfer element to the receiver sheet.

34. A thermal transfer printing process according to claim 33 wherein the first and second charging devices are charging electrodes.

35. A thermal transfer printing process according to claim 33 wherein the first and second charging devices are corotrons.

36. A thermal transfer printing process according to claim 35 wherein the receiver sheet is situated between the first charging device and a first backing electrode, and the transfer element is situated between the second charging device and a second backing electrode.

37. A thermal transfer printing process which comprises incorporating into a thermal transfer printing apparatus with a thermal printhead a transfer element comprising a substrate upon which is contained an ink, contacting the transfer element with a receiver sheet, applying heat imagewise from the printhead to the transfer element, and applying a field between the transfer element and the receiver sheet to enhance imagewise transfer of the ink from the transfer element to the receiver sheet, wherein the ink is contained in a polymeric sponge material situated in a layer on the substrate.

* * * * *